No. 778,399. PATENTED DEC. 27, 1904.
A. H. BROWN.
SPEEDOMETER.
APPLICATION FILED SEPT. 28, 1904.
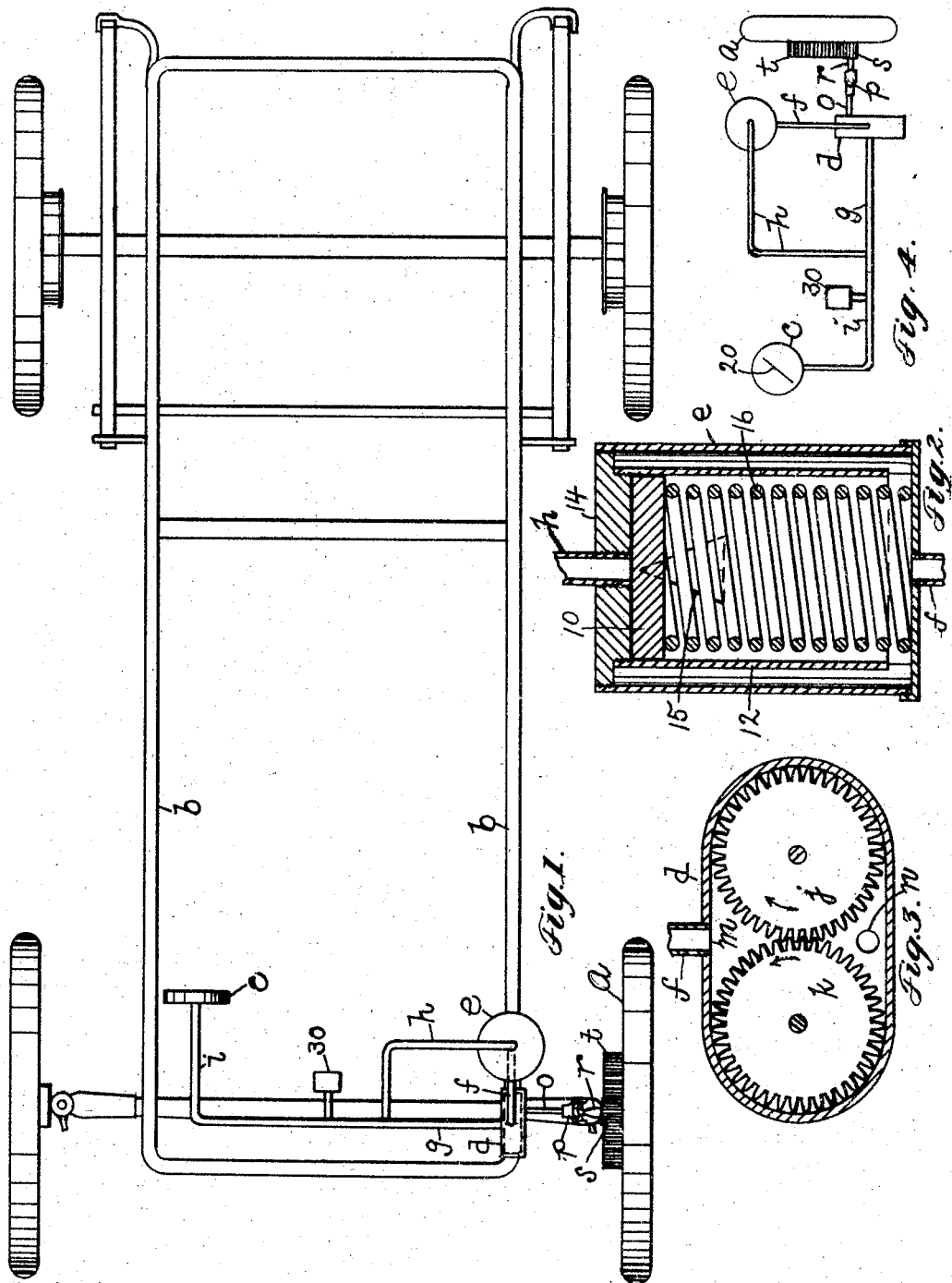
Witnesses.
C. H. Garnett
J. Murphy
Inventor:
Arthur H. Brown
by Jas. H. Churchill
atty.

No. 778,399. Patented December 27, 1904.

UNITED STATES PATENT OFFICE.

ARTHUR H. BROWN, OF LYNN, MASSACHUSETTS, ASSIGNOR OF ONE-HALF TO WALDO L. PEVEAR, OF LYNN, MASSACHUSETTS.

SPEEDOMETER.

SPECIFICATION forming part of Letters Patent No. 778,399, dated December 27, 1904.

Application filed September 28, 1904. Serial No. 226,265.

*To all whom it may concern:*

Be it known that I, ARTHUR H. BROWN, a citizen of the United States, residing in Lynn, in the county of Essex and State of Massachusetts, have invented an Improvement in Speedometers, of which the following description, in connection with the accompanying drawings, is a specification, like characters on the drawings representing like parts.

This invention relates to a speedometer especially applicable among other uses to be employed in indicating the speed of an automobile or other vehicle.

The invention has for its object to provide a simple, inexpensive, and reliable apparatus for the purpose specified. For this purpose I employ a circuit containing a fluid, which is circulated by the revolution of the part or member whose speed it is desired to indicate, which part for the purpose of this invention may be a front wheel of an automobile. The circuit referred to has communicating with it an indicator or gage, which is actuated by pressure of the fluid in the circuit, which pressure is regulated by a valve controlling the circulation of the fluid, as will be described. I prefer to employ an incompressible fluid, such as oil or glycerin, as the circulating medium.

These and other features of this invention will be pointed out in the claims at the end of this specification.

Figure 1 represents in plan a sufficient portion of an automobile provided with a speedometer embodying this invention to enable it to be understood; Fig. 2, a vertical section of the pressure-controlling valve; Fig. 3, a detail in longitudinal section of one form of pump employed for circulating the liquid, and Fig. 4 a diagrammatic view illustrating the invention shown in Fig. 1.

Referring to Figs. 1 and 4, $a$ represents the front wheel of an automobile $b$, which latter may be of any suitable or usual construction. The wheel $a$ constitutes the revolving part or member whose speed it is desired to indicate. For this purpose I employ a gage $c$ of any suitable construction, such as the well-known steam-gage whose pointer is actuated by expansion of the well-known Bourdon tube, and connect said gage with a circulating system comprising, as herein shown, a pump $d$, a tank $e$, and pipes $f$, $g$, and $h$, the pipe $f$ connecting the tank $e$ with the inlet-port of the pump, and the pipes $g$ $h$ connecting the outlet-port of the pump with the tank $e$. The gage $c$ is connected by the pipe $i$ with the pipe $g$, as shown in Fig. 4.

The circulating system referred to and the pipe $i$ and gage $c$ are filled with fluid, preferably oil or glycerin, which is circulated through the system comprising the pump $d$, the tank $e$, and the pipes $f$ $g$ $h$ by said pump, which is suitably connected with a vehicle $a$. The pump $d$ may be of any suitable construction and in the present instance is shown in Fig. 3 as two intermeshing gears $j$ $k$, located within a casing provided with a liquid-inlet port $m$ at its top and with a liquid-outlet port $n$ in one side near the bottom of the casing. The gear $j$ has its shaft $o$ joined by a suitable coupling $p$ to a short shaft $r$, provided with a pinion $s$, which meshes with a gear $t$, attached to the wheel $a$. The coupling $p$ may be of any suitable or usual construction which will permit the shaft $r$ to turn with the wheel $a$, yet which connects the shafts $o$ $r$, so that they revolve as one shaft.

The circulation of the liquid in the system is controlled by a valve, herein shown as a disk or piston valve 10, (see Fig. 2,) located within a cylinder 12, which may be located within the tank $e$, said cylinder being in open communication at one end with the tank and being secured at its other end to the head 14 of said tank. The cylinder 12 constitutes a valve-casing and the pipe $h$ communicates therewith through a suitable opening in the head 14.

Communication between the pipe $h$ and the tank $e$ is normally cut off by the valve 10, which coöperates with a substantially $\wedge$-shaped port 15 in the cylinder 12, the said valve being held in its normal position, (shown in Fig. 2,) in which the port 15 is closed by a spring 16.

In operation the pump $d$ is driven by rotation of the wheel $a$, and the liquid is drawn from the supply-tank $e$ and returned thereto by the pump through the pipes $g$ $h$. A portion of the liquid is forced through the pipe $i$ into the gage $c$. The circulation of the liquid through the system is controlled by the valve 10, which is moved against the opposition of the spring 16 to uncover the port 15, more or less, according to the pressure of the liquid, which pressure varies with the speed of the vehicle. As the pressure against the valve varies, the pressure of the liquid acting on the gage also varies, and this variation of pressure in the gage produces movement of the pointer 20 to indicate the speed of the revolving part or wheel $a$, and consequently indicating the speed of the vehicle. By reference to Fig. 2 it will be seen that when the vehicle is stationary the port 15 is closed by the valve 10 and that when the vehicle is in motion the said port is gradually uncovered and the area of the part of the port uncovered gradually increases as the speed of the vehicle increases. When the speed of the vehicle decreases, the area of the port uncovered by the valve is diminished, the spring 16 moving the valve toward its normal position as the fluid-pressure decreases.

In the present instance I have shown one arrangement of the system in which the valve is located in the liquid-tank; but I do not desire to limit my invention in this respect. So, also, I have herein represented the rotatable member as the wheel of a vehicle, but I do not desire to limit my invention in this respect, as the system may be employed equally as well to indicate the speed of other rotatable parts, such, for instance, as a shaft.

I may prefer to connect with the circulating system an air-chamber 30, which is shown in the present instance as connected with the pipe $i$. The air-chamber 30 serves to render the pressure of the liquid upon the gage steady, and thereby avoids rapid vibrations of the pointer.

I claim—

1. In a speedometer, the combination with a rotatable member, of a pump connected with said member to be driven thereby, a fluid-supply tank or vessel, means for connecting said supply-tank with said pump to form a circuit, a fluid in said circuit, a gage communicating with said circuit and responsive to variations in pressure of the fluid in said circuit, and a valve actuated by the fluid-pressure in the circuit to regulate the pressure upon the said gage, substantially as described.

2. In a speedometer, the combination with a rotatable member, of a pump connected with said member to be driven thereby, a tank connected with said pump for the circulation of fluid, a valve-casing within said tank provided with a port, a valve within said casing coöperating with said port, and a gage connected with said pump and responsive to the fluid-pressure created by said pump, said valve regulating the fluid-pressure upon the said gage, substantially as described.

3. In a speedometer, the combination with a rotatable member, of a pump connected with said member to be driven thereby, a tank connected with said pump for the circulation of fluid, a valve-cylinder within said tank provided with a port, a piston-valve in said cylinder coöperating with said port, a spring to move said valve to close said port, and a gage connected with said pump and responsive to the fluid-pressure created by said pump, said valve being moved by said fluid-pressure to uncover said port and thereby regulate the pressure on said gage, substantially as described.

4. In a speedometer, the combination with a rotatable member, of a fluid-containing circuit provided with means actuated by said rotatable member for circulating said fluid in said circuit, an indicating mechanism responsive to the pressure of the fluid in said circuit, and means in said circuit actuated by the fluid-pressure therein for controlling the operation of said indicating mechanism, substantially as described.

5. In a speedometer, the combination with a rotatable member, of a pump connected with said member to be driven thereby, a liquid-supply tank or vessel, means for connecting said supply-tank with said pump to form a circuit, a liquid in said circuit, a gage communicating with said circuit and responsive to variations in pressure of the fluid in said circuit, an air-chamber communicating with said circuit, and a valve actuated by the fluid-pressure in the circuit to regulate the pressure upon the said gage, substantially as described.

In testimony whereof I have signed my name to this specification in the presence of two subscribing witnesses.

ARTHUR H. BROWN.

Witnesses:
JAS. H. CHURCHILL,
J. MURPHY.